US012586868B2

(12) United States Patent
Kim et al.

(10) Patent No.: US 12,586,868 B2
(45) Date of Patent: Mar. 24, 2026

(54) SEPARATOR INCLUDING INORGANIC POROUS COATING LAYER INCLUDING POLAR BINDER AND ACRYLIC BINDER WITH DIFFERENT GLASS TRANSITION TEMPERATURES, ELECTROCHEMICAL DEVICE, AND METHOD FOR MANUFACTURING THE SAME

(71) Applicants: LG ENERGY SOLUTION, LTD., Seoul (KR); ULSAN NATIONAL INSTITUTE OF SCIENCE AND TECHNOLOGY, Ulju-gun (KR)

(72) Inventors: Ji-Eun Kim, Daejeon (KR); Sang-Young Lee, Ulju-gun (KR); So-Mi Jeong, Daejeon (KR); Ji-Young Seo, Ulju-gun (KR); Yong-Hyeok Lee, Ulju-gun (KR); Je-An Lee, Daejeon (KR)

(73) Assignees: LG ENERGY SOLUTION, LTD., Seoul (KR); ULSAN NATIONAL INSTITUTE OF SCIENCE AND TECHNOLOGY, Ulsan (KR)

( * ) Notice: Subject to any disclaimer, the term of this patent is extended or adjusted under 35 U.S.C. 154(b) by 649 days.

(21) Appl. No.: 17/917,156

(22) PCT Filed: Apr. 6, 2021

(86) PCT No.: PCT/KR2021/004306

§ 371 (c)(1),
(2) Date: Oct. 5, 2022

(87) PCT Pub. No.: WO2021/206431

PCT Pub. Date: Oct. 14, 2021

(65) Prior Publication Data

US 2023/0163413 A1 May 25, 2023

(30) Foreign Application Priority Data

Apr. 6, 2020 (KR) ........................ 10-2020-0041791

(51) Int. Cl.
*H01M 50/446* (2021.01)
*H01M 10/0525* (2010.01)
(Continued)

(52) U.S. Cl.
CPC ..... *H01M 50/446* (2021.01); *H01M 10/0525* (2013.01); *H01M 50/449* (2021.01); *H01M 50/46* (2021.01); *H01M 50/491* (2021.01)

(58) Field of Classification Search
CPC .. H01M 50/446; H01M 50/491; H01M 50/46; H01M 50/449; H01M 10/0525
(Continued)

(56) References Cited

U.S. PATENT DOCUMENTS

2009/0111025 A1 4/2009 Lee et al.
2012/0251869 A1* 10/2012 Lee .................... H01M 50/403 429/144
(Continued)

FOREIGN PATENT DOCUMENTS

EP 4 135 113 A1 2/2023
JP 6334071 B1 * 5/2018 ............ B32B 27/08
(Continued)

OTHER PUBLICATIONS

Chandra et al., Characterization of high ionic conducting PVAc-PMMA blend-based polymer electrolyte for electrochemical applications, Jul. 2016, Ionics, 22, 2409-2420 (Year: 2016).*
(Continued)

*Primary Examiner* — Sean P Cullen
(74) *Attorney, Agent, or Firm* — Birch, Stewart, Kolasch & Birch, LLP

(57) ABSTRACT

A separator for an electrochemical device provided with a porous coating layer including multiple types of binder
(Continued)

resins, and a method for manufacturing the same. The separator has high adhesion between an electrode and the separator, even when any separate adhesive layer is not disposed on the surface of the separator. In addition, the separator has higher adhesion to an electrode, as compared to a separator using a fluorinated binder resin, such as polyvinylidene fluoride, used conventionally in the art. In addition, since the separator has no separate adhesive layer, it is possible to provide low interfacial resistance between the separator and an electrode. Further, the separator has high affinity to an electrolyte, as compared to a semi-crystalline polymer, such as a fluorinated binder resin, and thus improves the output characteristics of a battery.

16 Claims, 7 Drawing Sheets

(51) Int. Cl.

| | |
|---|---|
| ***H01M 50/449*** | (2021.01) |
| ***H01M 50/46*** | (2021.01) |
| ***H01M 50/491*** | (2021.01) |

(58) Field of Classification Search
USPC .......................................... 429/144, 251, 254
See application file for complete search history.

(56) References Cited

U.S. PATENT DOCUMENTS

| | | | | |
|---|---|---|---|---|
| 2016/0293999 | A1 | 10/2016 | Kim et al. | |
| 2017/0149039 | A1 | 5/2017 | Shon et al. | |
| 2018/0309108 | A1 | 10/2018 | Shin et al. | |
| 2020/0014010 | A1 | 1/2020 | Kwon et al. | |
| 2020/0119323 | A1 | 4/2020 | Ko et al. | |
| 2020/0152945 | A1 | 5/2020 | Kim et al. | |
| 2021/0066692 | A1 | 3/2021 | Jeong et al. | |
| 2021/0280945 | A1 | 9/2021 | Kim et al. | |
| 2023/0138202 | A1* | 5/2023 | Kim .................... | H01M 10/052 429/129 |

FOREIGN PATENT DOCUMENTS

| | | | |
|---|---|---|---|
| JP | 6334079 | B1 | 5/2018 |
| KR | 10-0324626 | B1 | 2/2002 |
| KR | 10-2000-0072065 | A | 6/2006 |
| KR | 10-2013-0083211 | A | 7/2013 |
| KR | 10-2014-0139292 | A | 12/2014 |
| KR | 10-2015-0059621 | A | 6/2015 |
| KR | 10-2017-0113474 | A | 10/2017 |
| KR | 10-2019-0080717 | A | 6/2018 |
| KR | 10-2016-0084063 | A | 7/2018 |
| KR | 10-2019-0076913 | A | 7/2019 |
| KR | 10-2019-0083894 | A | 7/2019 |
| KR | 10-2020-0034470 | A | 3/2020 |
| KR | 10-2017-0129639 | A | 12/2025 |
| WO | WO 2012/050152 | A1 | 4/2012 |
| WO | WO 2020/087778 | A1 | 4/2020 |

OTHER PUBLICATIONS

Rajendran et al., Preparation and characterization of PVAc-PMMA-based solid polymer blend electrolytes, Nov. 2009, Ionics, 16, 283-287 (Year: 2009).*

Extended European Search Report for corresponding European Application No. 21783718.6, dated Oct. 24, 2023.

Fedelich, "Application Handbook Thermal analysis of polymers selected applications thermal analysis", Jan. 1, 2013, XP055608279, Retrieved from the Internet https://www.mt.com/dam/LabDiv/guidesglen/ta-polymer/TA_Polymers_Selected_Apps_EN.pdf.

International Search Report (PCT/ISA/210) issued in PCT/KR2021/004306, dated Jul. 23, 2021.

Lee et al., "Electrochemical effect of coating layer on the separator based on PVdF and PE non-woven matrix", Journal of Power Sources, vol. 146, Nos. 1-2: June 3. 2005, pp. 431-435.

Sohn et al., "PVDF-HFP/PMMA-coated PE separator for lithium ion battery", J Solid State Electrochem. vol. 16, No. 2, Apr. 12, 2011, pp. 551-556.

* cited by examiner

SEPARATOR INCLUDING INORGANIC POROUS COATING LAYER INCLUDING POLAR BINDER AND ACRYLIC BINDER WITH DIFFERENT GLASS TRANSITION TEMPERATURES, ELECTROCHEMICAL DEVICE, AND METHOD FOR MANUFACTURING THE SAME

TECHNICAL FIELD

The present application claims priority to Korean Patent Application No. 10-2020-0041791 filed on Apr. 6, 2020 in the Republic of Korea. The present disclosure relates to a separator used for an electrochemical device, such as a secondary battery, and a method for manufacturing the same.

BACKGROUND ART

As technological development and needs for mobile instruments have been increased, secondary batteries as energy sources have been in rapidly increased in demand. Recently, use of secondary batteries as power sources for electric vehicles (EV), hybrid electric vehicles (HEV), or the like, have been realized. Accordingly, active studies have been conducted about secondary batteries capable of meeting various needs. Particularly, there is a high need for lithium secondary batteries having high energy density, high discharge voltage and output stability. More particularly, it is required for lithium secondary batteries used as power sources for electric vehicles and hybrid electric vehicles to have high output characteristics so that they may realize a high output in a short time. A polyolefin-based microporous film used conventionally as a separator for an electrochemical device shows a severe heat shrinking behavior at a temperature of 100° C. or higher due to its material property and a characteristic during its manufacturing process, including orientation, thereby causing a short-circuit between a positive electrode and a negative electrode. To overcome such problems, recently, there has been applied a separator having a porous coating layer including a mixture containing inorganic particles and a binder polymer on at least one surface of a separator substrate, such as a polyolefin-based microporous membrane, having a plurality of pores. In general, the binder polymer used for the porous coating layer includes a PVDF-based binder resin including vinylidene as a polymerization unit. However, when using such a PVDF-based binder resin, there is a limitation in realization of high adhesive property. Therefore, there is a need for developing a binder resin composition suitable for a binder resin of a porous coating layer of a separator.

DISCLOSURE

Technical Problem

The present disclosure is designed to solve the problems of the related art, and therefore the present disclosure is directed to providing a separator for an electrochemical device which has improved adhesion to an electrode and shows a low shrinkage, and a method for manufacturing the same. The present disclosure is also directed to providing a binder resin composition used for the separator. It will be easily understood that the objects and advantages of the present disclosure may be realized by the means shown in the appended claims and combinations thereof.

Technical Solution

According to the first embodiment of the present disclosure, there is provided a separator for an electrochemical device which includes a porous separator substrate and a porous coating layer on at least one surface of the porous separator substrate, wherein the porous coating layer includes inorganic particles and a binder resin at a weight ratio of about 50:50-99:1, the binder resin includes a first binder resin and a second binder resin, the first binder resin is an ethylenic polymer resin comprising a polar group having a glass transition temperature (Tg) of 30° C. to 60° C., and the second binder resin is an acrylic binder resin having a glass transition temperature (Tg) of 80° C. to 120° C.

According to the second embodiment of the present disclosure, there is provided the separator for an electrochemical device as defined in the first embodiment, wherein the binder resin further includes a third binder resin which has a molecular weight (Mw) of 500,000 or less, and the third binder resin is a vinylic polymer having a cyano group bound to a vinylic polymer backbone thereof.

According to the third embodiment of the present disclosure, there is provided the separator for an electrochemical device as defined in the first or the second embodiment, wherein the first binder resin is present in an amount of 50 wt % to 90 wt % based on 100 wt % of the binder resin, and the second binder resin is present in an amount of 10 wt % to 50 wt % based on 100 wt % of the binder resin.

According to the fourth embodiment of the present disclosure, there is provided the separator for an electrochemical device as defined in any one of the first to the third embodiments, wherein the third binder resin is present in an amount of 6 wt % or less based on 100 wt % of the binder resin.

According to the fifth embodiment of the present disclosure, there is provided the separator for an electrochemical device as defined in any one of the first to the fourth embodiments, wherein the first binder resin has a molecular weight (Mw) of 100,000-500,000 and includes polyvinyl acetate (PVA) represented by the following Chemical Formula 1:

[Chemical Formula 1]

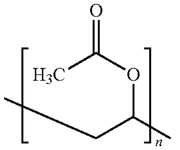

wherein n is an integer of 1 or more.

According to the sixth embodiment of the present disclosure, there is provided the separator for an electrochemical device as defined in any one of the first to the fifth embodiments, wherein the second binder resin includes polymethyl methacrylate (PMMA) represented by the following Chemical Formula 2:

[Chemical Formula 2]

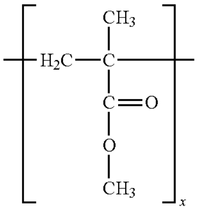

wherein x is an integer of 1 or more.

According to the seventh embodiment of the present disclosure, there is provided the separator for an electrochemical device as defined in any one of the second to the sixth embodiments, wherein the third binder resin includes polyacrylonitrile (PAN).

According to the eighth embodiment of the present disclosure, there is provided a separator for an electrochemical device which includes a porous separator substrate and a porous coating layer on at least one surface of the porous separator substrate, wherein the porous coating layer includes inorganic particles and a binder resin at a weight ratio of about 50:50 to 99:1, the binder resin includes a first binder resin, a second binder resin and a third binder resin, the first binder resin has a glass transition temperature (Tg) of 30° C. to 60° C. and includes polyvinyl acetate (PVAc), the second binder resin has a glass transition temperature (Tg) of 80° C. to 120° C. and includes polymethyl methacrylate (PMMA), and the third binder resin includes polyacrylonitrile (PAN).

In addition, according to the ninth embodiment of the present disclosure, there is provided an electrochemical device including a positive electrode, a negative electrode and a separator interposed between the positive electrode and the negative electrode, wherein the separator is the same as defined in any one of the first to the eighth embodiments.

In addition, according to the tenth embodiment of the present disclosure, there is provided a lithium-ion secondary battery including the electrochemical device as defined in the ninth embodiment.

Advantageous Effects

The separator obtained by using the binder resin composition according to the present disclosure shows high adhesion between an electrode and the separator, even when any separate adhesive layer is not disposed on the surface of the separator. In addition, the separator shows higher adhesion to an electrode, as compared to a separator using a fluorinated binder resin, such as polyvinylidene fluoride, used conventionally in the art. Therefore, when introducing the separator according to the present disclosure to a battery, it is possible to manufacture an electrode assembly under a mild temperature and pressure condition, to improve the productivity of assemblage, to reduce defect generation, and thus to increase the yield. In addition, since the separator according to the present disclosure has no separate adhesive layer, it is possible to provide low interfacial resistance between the separator and an electrode. Further, the separator shows high affinity to an electrolyte, as compared to a semi-crystalline polymer, such as a fluorinated binder resin, and thus improves the output characteristics of a battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
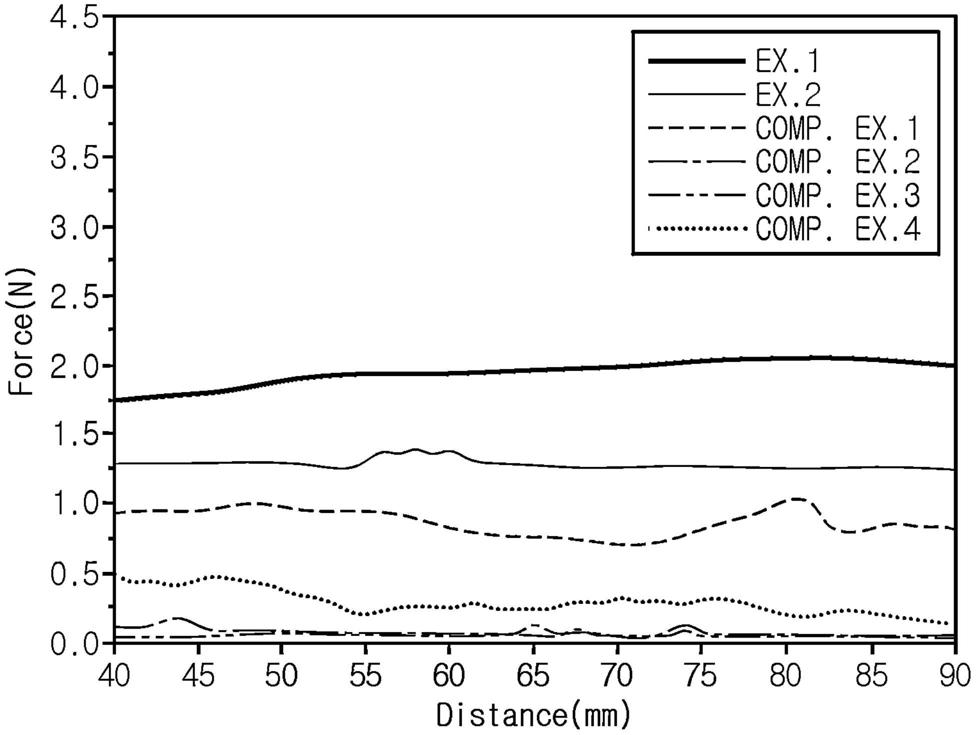
FIG. 1 shows the result of evaluation of the adhesion of the separator according to Examples and that of Comparative Examples.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression ‘a part includes, comprises an element’ does not preclude the presence of any additional elements but means that the part may further include the other elements.

As used herein, the terms ‘approximately’, ‘substantially’, or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression ‘A and/or B’ means ‘A, B or both of them’.

Unless otherwise stated, temperature is expressed in the unit of a Celsius degree, and content or content ratio is expressed on the weight basis.

The terms, ‘top’, ‘bottom’, ‘left’ and ‘right’ represent positions or directions in drawings to which reference is made, and are not used for limitary purposes.

Specific terms used in the following description are for the convenience of description and understanding, and the scope of the present disclosure is not limited thereto. Such terms include the above-listed words, derivatives thereof and synonyms thereof.

The present disclosure relates to a binder resin composition used for manufacturing a separator. The present disclosure also relates to a separator including the binder resin composition. In addition, the present disclosure relates to a method for manufacturing the separator.

Herein, the electrochemical device is a system in which chemical energy is converted into electrical energy through electrochemical reactions, has a concept including a primary battery and a secondary battery, wherein the secondary battery is capable of charging and discharging and has a concept covering a lithium-ion battery, a nickel-cadmium battery, a nickel-metal hydride battery, or the like.

According to the present disclosure, the separator functions as an ion-conducting barrier which allows ions to pass therethrough, while interrupting an electrical contact between a negative electrode and a positive electrode. The separator has a plurality of pores formed therein, and the pores are interconnected preferably so that gases or liquids may pass from one surface of the separator to the other surface of the separator.

According to an embodiment of the present disclosure, the separator includes a porous separator substrate including a polymer material, and a porous coating layer formed on at least one surface of the substrate, wherein the porous coating layer includes inorganic particles and a binder resin. In the porous coating layer, the inorganic particles are bound to one another by means of the binder resin. And, the porous coating layer may have a porous structure including pores derived from the interstitial volumes formed among the inorganic particles.

The porous coating layer includes a binder resin and inorganic particles, has a plurality of micropores therein, wherein the micropores are interconnected with one another, and shows structural characteristics as a porous layer through which gases or liquids pass from one surface to the other surface. According to an embodiment of the present disclosure, the porous coating layer includes the binder resin and inorganic particles at a weight ratio of 50:50-1:99. The ratio may be controlled suitably within the above-defined range. For example, the binder resin may be used in an amount of 50 wt % or less, 40 wt % or less, or 30 wt % or less, based on 100 wt % of the combined weight of the binder resin and inorganic particles. In addition, within the above-defined range, the binder resin may be used in an amount of 1 wt % or more, 5 wt % or more, or 10 wt % or more. According to the present disclosure, the porous coating layer preferably has a porous structure with a view to ion permeability. According to an embodiment of the present disclosure, when the content of the binder resin is less than 1 wt %, the adhesion between the separator and an electrode is not sufficient. When the content of the binder resin is excessively high, porosity may be degraded, and the battery using the separator shows increased resistance to cause degradation of the electrochemical characteristics of the battery.

According to an embodiment of the present disclosure, in the porous coating layer, the inorganic particles are bound to one another and integrated with one another by means of a polymer resin, wherein the interstitial volumes among the inorganic particles may form pores. As used herein, 'interstitial volume' means a space defined by the inorganic particles facing each other substantially in a closely packed or densely packed structure of the inorganic particles.

According to an embodiment of the present disclosure, the porous coating layer may have a porosity of 40-70 vol %. Within the above-defined range, the porosity may be 40 vol % or more, or 45 vol % or more. In combination with this or independently from this, the porosity may be 70 vol % or less, or 65 vol % or less. Considering ion conductivity, i.e. in order to ensure a sufficient path through which ions can pass, the porosity may be controlled to 40 vol % or more. In addition, in order to ensure heat resistance and adhesiveness, the porosity may be controlled to 65 vol % or less. Therefore, considering such electrochemical characteristics, the porosity of the porous coating layer may be controlled suitably within the above-defined range.

Meanwhile, according to the present disclosure, the porous coating layer may have a total thickness controlled suitably within a range of 1-10 μm. The total thickness of the porous coating layer is the sum of the thicknesses of the porous coating layers formed on the surfaces of all sides of the separator substrate. If a porous coating layer is formed merely on one surface of the separator substrate, the thickness of the porous coating layer may satisfy the above-defined range. If porous coating layers are formed on both surfaces of the separator substrate, the sum of the thicknesses of both porous coating layers may satisfy the above-defined range. When the thickness of the porous coating layer is less than 1 μm, it is not possible to obtain a sufficient effect of improving heat resistance due to an excessively small amount of inorganic particles contained in the porous coating layer. Meanwhile, when the thickness of the porous coating layer is excessively thicker than the above-defined range, the separator has a large thickness, thereby making it difficult to manufacture a thin battery and to improve the energy density of a battery.

Meanwhile, according to an embodiment of the present disclosure, the porous coating layer includes inorganic particles and a binder resin. According to the present disclosure, the binder resin includes a first binder resin and a second binder resin. According to the present disclosure, the binder resin may further include a third binder resin. Among the binder resin, the first binder resin may be used in an amount of about 50-90 wt %. The first binder resin shows a relatively low glass transition temperature (Tg). Thus, when the content of the first binder resin is larger than 90 wt %, it is possible to obtain high adhesion partially, but it is difficult to ensure uniform adhesion throughout the whole surface of the separator. In addition, the separators obtained by using such an excessive amount of the first binder show a deviation in adhesion, thereby making it difficult to ensure uniform reproducibility. On the contrary, when the content of the first binder resin is less than 50 wt %, it is difficult to realize high adhesion characteristics due to such a low amount of the first binder resin.

Meanwhile, the second binder resin may be used in an amount of 10-50 wt %. The second binder resin shows a relatively higher glass transition temperature as compared to the first binder resin. Thus, when the second binder resin is used within the above-defined range, it is possible to solve the problem of non-uniform adhesion caused by such a relatively low Tg of the first binder resin.

Meanwhile, the third binder resin may be used in an amount of about 6 wt % or less, or 5 wt % or less, based on 100 wt % of the binder resin. It is possible to enhance the effect of improving adhesion through the addition of the third binder resin. However, when the third binder resin is introduced in an excessive amount, viscosity is increased to cause deterioration of phase separation, and thus a desired level of adhesion may not be ensured. Therefore, it is preferred to control the content of the third binder resin within the above-defined range in order to ensure suitable adhesion and to prevent an increase in viscosity.

The first binder resin may include an ethylenic polymer resin containing a polar group. According to an embodiment of the present disclosure, the first binder resin has a glass transition temperature (Tg) of 30-60° C. Meanwhile, the first binder resin may have a molecular weight (Mw) of 100,000-500,000. According to an embodiment of the present disclosure, the ethylenic polymer resin containing a polar group may include polyvinyl acetate (PVAc) represented by the following Chemical Formula 1:

[Chemical Formula 1]

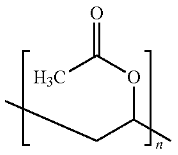

wherein n is an integer of 1 or more.

The second binder resin includes an acrylic binder resin, and the acrylic binder resin has a glass transition temperature (Tg) of 80-120° C. When the second binder resin has a glass transition temperature lower than the drying temperature as described hereinafter, the binder resin may be distributed non-homogeneously, and for example, the binder resin may be distributed in such a manner that it may be concentrated locally in the porous coating layer. On the contrary, when the glass transition temperature is higher than 120° C., it is higher than the temperature applied to the electrode-separator lamination process as described hereinafter. Therefore, it is difficult to ensure a desired level of adhesion. Meanwhile, the first binder resin may have a molecular weight (Mw) of 100,000-500,000. According to an embodiment of the present disclosure, the acrylic binder resin may include a C1-C8 alkyl acrylate and/or alkyl methacrylate as a monomer. Particular examples of the alkyl acrylate include at least one selected from methyl acrylate, ethyl acrylate, isopropyl acrylate, n-butyl acrylate, isobutyl acrylate, cyclohexyl acrylate and 2-ethylhexyl acrylate. In addition, particular examples of the alkyl methacrylate include at least one selected from methyl methacrylate, ethyl methacrylate, isopropyl methacrylate, n-butyl methacrylate, isobutyl methacrylate, cyclohexyl methacrylate and 2-ethylhexyl methacrylate. According to an embodiment of the present disclosure, polymethyl methacrylate (PMMA) may be used as the second binder resin. Herein, PMMA may be represented by the following Chemical Formula 2:

[Chemical Formula 2]

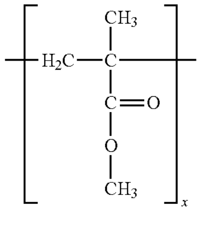

wherein x is an integer of 1 or more.

Meanwhile, according to an embodiment of the present disclosure, the third binder resin is a vinylic polymer containing a cyano group bound to the backbone thereof, and the vinylic polymer has a molecular weight (Mw) of 500,000 or less. The third binder resin uses dimethyl formamide (DMF) or N-methyl pyrrolidone (NMP) as a solvent, and preferably has a low molecular weight of 500,000 or less considering the solubility to the solvent. According to an embodiment of the present disclosure, the third binder resin may include polyacrylonitrile (PAN) that may be represented by the following Chemical Formula 3:

[Chemical Formula 3]

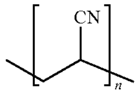

wherein n is an integer of 1 or more.

According to the present disclosure, the term 'molecular weight' refers to weight average molecular weight (Mw). According to an embodiment of the present disclosure, the molecular weight (Mw) may be determined by using gel permeation chromatography (GPC). For example, 200 mg of a polymer resin to be analyzed is diluted in 200 mL of a solvent, such as tetrahydrofuran (THF), to prepare a sample having a concentration of about 1000 ppm, and the molecular weight may be determined by using an Agilent 1200 series GPC instrument at a flow rate of 1 mL/min through a refractive index (RI) detector.

In addition, besides the first to the third binder resins, the porous coating layer may further include at least one fourth binder resin selected from the group consisting of a vinylidene-containing fluorinated binder resin, polyvinyl pyrrolidone, polyethylene oxide, polyarylate, cyanoethyl pullulan, cyanoethyl polyvinyl alcohol, cyanoethyl cellulose, cyanoethyl sucrose and pullulan, if necessary. The fourth binder resin may be present in an amount of 10 wt % or less, 5 wt % or less, or 1 wt % or less, based on 100 wt % of the total weight of the binder resins contained in the porous coating layer.

According to an embodiment of the present disclosure, there is no particular limitation in the inorganic particles, as long as they are electrochemically stable. In other words, there is no particular limitation in the inorganic particles that may be used herein, as long as they cause no oxidation and/or reduction in the range (e.g. 0-5V based on $Li/Li^+$) of operating voltage of an applicable electrochemical device. Particularly, when using inorganic particles having a high dielectric constant as inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may be inorganic particles having a dielectric constant of 5 or more, preferably 10 or more. Non-limiting examples of the inorganic particles having a dielectric constant of 5 or more may include at least one selected from the group consisting of $BaTiO_3$, $Pb(Zr,Ti)O_3$ (PZT), $Pb_{1-x}La_xZr_{1-y}Ti_yO_3$ (PLZT, wherein $0<x<1$, $0<y<1$), $Pb(Mg_{1/3}Nb_{2/3})O_3PbTiO_3$ (PMN-PT), hafnia ($HfO_2$), $SrTiO_3$, $SnO_2$, $CeO_2$, MgO, $Mg(OH)_2$, NiO, CaO, ZnO, $ZrO_2$, $SiO_2$, $Y_2O_3$, $Al_2O_3$, SiC, $Al(OH)_3$, AlOOH and $TiO_2$.

In addition, inorganic particles having lithium-ion transportability, i.e. inorganic particles containing lithium elements, and not storing lithium but transporting lithium ions, may be used as inorganic particles. Non-limiting examples of the inorganic particles having lithium-ion transportability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($1<x<4$, $0<y<13$), such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, 0<x<4, 0<y<2), such as $Li_3N$, $SiS_2$-based glass ($Li_xSi_yS_z$, 0<x<3, 0<y<2, 0<z<4), such as $Li_3PO_4$—$Li_2S$—$SiS_2$, and $P_2S_5$-based glass ($Li_xP_yS_z$, 0<x<3, 0<y<3, 0<z<7), such as LiI—$Li_2S$—$P_2S_5$, or a mixture thereof.

Further, the inorganic particles may have an average particle diameter ($D_{50}$) of 10 nm to 5 μm. Meanwhile, when the particles have an average particle diameter ($D_{50}$) of less than 10 nm, the inorganic particles have an excessively large surface area to cause degradation of dispersibility of the inorganic particles in slurry for forming a porous coating layer during the preparation of the slurry. Meanwhile, as the particle diameter of the inorganic particles is increased, the mechanical properties of the separator may be degraded. Therefore, it is preferred that the particle diameter of the inorganic particles does not exceed 5 μm.

According to an embodiment of the present disclosure, the particle diameter ($D_{50}$) of the inorganic particles refers to an integrated value at 50% from the side of smaller particles calculated based on the results of determination of the particle size distribution of particles after classification using a particle size analyzer used conventionally in the art.

Such particle size distribution can be determined by a diffraction or scattering intensity pattern generated upon the contact of light with the particles. As a particle size distribution analyzer, Microtrac 9220FRA or Microtrac HRA available from Nikkiso may be used.

As described above, the separator according to the present disclosure includes a porous separator substrate including a polymer material. The separator substrate may be a porous film including a polymer resin, such as a porous polymer film made of a polyolefin material including polyethylene, polypropylene, or the like. The separator substrate may be molten at least partially, when the battery temperature is increased, and thus blocks the pores to induce shut-down. According to an embodiment of the present disclosure, the separator substrate may have a porosity of 40-70 vol %. Meanwhile, the pores of the separator substrate may have a diameter of about 10-70 nm based on the largest diameter of the pores. According to the present disclosure, the separator substrate may have a thickness of 5-14 μm with a view to thin filming and high energy density of an electrochemical device.

According to the present disclosure, the term 'porosity' means a volume occupied by pores based on the total volume of a structure, is expressed in the unit of percentage (%), and may be used exchangeably with the terms, such as pore ratio, porous degree, or the like. According to the present disclosure, the method for determining porosity is not particularly limited. According to an embodiment of the present disclosure, the porosity may be determined by the Brunauer-Emmett-Teller (BET) method using nitrogen gas or Hg porosimetry and according to ASTM D-2873. Further, the net density of a separator may be calculated from the density (apparent density) of the separator and the compositional ratio of ingredients contained in the separator and density of each ingredient, and the porosity of the separator may be calculated from the difference between the apparent density and the net density.

Meanwhile, according to an embodiment of the present disclosure, the pore size, pore size distribution and mean pore size (nm) may be determined by using a capillary flow porometer. The capillary flow porometer is based on the process including wetting the pores of a separator with a liquid having a known surface tension, and applying pneumatic pressure thereto to measure the bubble point (max pore) where the initial flux is generated. Particular examples of the capillary flow porometer include CFP-1500-AE available from Porous Materials Co., or the like.

Meanwhile, according to an embodiment of the present disclosure, the separator substrate may further include at least one polymer resin selected from polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene, if necessary, for improving durability, or the like.

According to an embodiment of the present disclosure, the separator substrate may be a porous polymer film obtained by the method as described hereinafter, and may be a sheet of monolayer film or a multilayer film formed by lamination of two or more sheets. When two or more sheets are laminated, each layer preferably has the above-described characteristics in terms of its ingredients.

The methods for manufacturing the separator are not particularly limited, as long as the methods can provide the above-described structure. For example, the separator may be obtained by introducing the binder resin composition and inorganic particles to a suitable solvent to prepare slurry for forming a porous coating layer, and applying the slurry to at least one surface of the polymer substrate, followed by drying. According to an embodiment of the present disclosure, the drying may be carried out by allowing the coated polymer substrate under a relative humidity of about 40-80% for a predetermined time so that the binder resin may be solidified. Herein, phase separation of the binder resin is induced. As the solvent migrates toward the surface portion of the inorganic coating layer and the binder resin migrates toward the surface portion of the inorganic coating layer along with the migration of the solvent, the content of the binder resin is increased at the surface portion of the porous coating layer. Meanwhile, at the portion under the surface portion of the porous coating layer, pores are formed due to the interstitial volumes among the inorganic particles so that the porous coating layer may be provided with porous property. According to an embodiment of the present disclosure, particular examples of the solvent may include acetone, methyl ethyl ketone, N-methyl pyrrolidone, polar amide solvent, such as dimethyl acetamide or diethyl formamide, and such solvents may be used alone or in combination.

Meanwhile, the third binder resin has relatively lower solubility to the solvent, such as acetone. Therefore, according to an embodiment of the present disclosure, each of the first slurry, including inorganic particles and the first and the second binder resins, and a polymer solution including the third binder resin are prepared separately from each other, and then the first slurry and the polymer solution may be mixed with each other to prepare slurry for forming a porous coating layer. Herein, the polymer solution may include at least one solvent selected from dimethyl formamide (DMF), N-methyl-2-pyrrolidone (NMP), dimethyl acetamide (DMAC), tetrahydrofuran (THF), methyl isobutyl ketone (MIBK), methyl ethyl ketone (MEK), or the like.

The slurry for forming a porous coating layer may be applied through a conventional coating process, such as Meyer bar coating, die coating, reverse roll coating, gravure coating, or the like. When forming the porous coating layers on both surfaces of the separator substrate, the coating solution may be applied to a single surface sequentially, and then humidified phase separation and drying may be carried out. However, it is preferred in terms of productivity that the coating solution is applied to both surfaces of the separator substrate at the same time, and then humidified phase separation and drying are carried out.

According to an embodiment of the present disclosure, the secondary battery includes: an electrode assembly including a negative electrode, a positive electrode and a separator interposed between the negative electrode and the positive electrode; and an electrolyte. The electrode assembly may be received in a battery casing, and the electrolyte may be injected thereto to provide a battery.

According to the present disclosure, the positive electrode includes a positive electrode current collector, and a positive electrode active material layer formed on at least one surface of the current collector and containing a positive electrode active material, a conductive material and a binder resin. The positive electrode active material may include any one selected from: layered compounds, such as lithium manganese composite oxide ($LiMn_2O_4$, $LiMnO_2$, etc.), lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$);

lithium vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M is Co, Ni, Fe, Cr, Zn or Ta, and x is 0.01-0.1) or $Li_2Mn_3MO_8$ (wherein M is Fe, Co, Ni, Cu or Zn); $LiMn_2O_4$ in which Li is partially substituted with an alkaline earth metal ion; disulfide compounds; and $Fe_2(MoO_4)_3$; or a mixture of two or more of them.

According to the present disclosure, the negative electrode includes a negative electrode current collector, and a negative electrode active material layer formed on at least one surface of the current collector and containing a negative electrode active material, a conductive material and a binder resin. The negative electrode may include, as a negative electrode active material, any one selected from: lithium metal oxide; carbon such as non-graphitizable carbon or graphite-based carbon; metal composite oxides, such as $LixFe_2O_3$ ($0<x<1$), $Li_xWO_2$ ($0<x<1$), $Sn_xMe_{1-x}Me'_yO_z$ (Me: Mn, Fe, Pb, Ge; Me': Al, B, P, Si, elements of Group 1, 2 or 3 in the Periodic Table, halogen; $0<x<1$; $1<y<3$; $1<z<8$); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide; or a mixture of two or more of them.

According to an embodiment of the present disclosure, the conductive material may be any one selected from the group consisting of graphite, carbon black, carbon fibers or metal fibers, metal powder, conductive whiskers, conductive metal oxides, activated carbon and polyphenylene derivatives, or a mixture of two or more of such conductive materials. More particularly, the conductive material may be any one selected from natural graphite, artificial graphite, structured carbon black (e.g., Super-P®), acetylene black, conductive carbon black (e.g., Ketjenblack®), channel black, furnace black, lamp black, thermal black, acetylene carbon black (e.g., Denka Black®), aluminum powder, nickel powder, zinc oxide, potassium titanate and titanium dioxide, or a mixture of two or more such conductive materials.

The current collector is not particularly limited, as long as it causes no chemical change in the corresponding battery and has high conductivity. Particular examples of the current collector may include stainless steel, copper, aluminum, nickel, titanium, baked carbon, aluminum or stainless steel surface-treated with carbon, nickel, titanium or silver, or the like.

The binder resin may be a polymer used conventionally for an electrode in the art. Non-limiting examples of the binder resin may include, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, and carboxymethyl cellulose.

According to the present disclosure, the electrolyte is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2$—, $C(CF_2SO_2)_3^-$or a combination thereof, the salt being dissolved or dissociated in an organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), and mixtures thereof. However, the present disclosure is not limited thereto.

In addition, the present disclosure provides a battery module which includes a battery including the electrode assembly as a unit cell, a battery pack including the battery module, and a device including the battery pack as an electric power source. Particular examples of the device include, but are not limited to: power tools driven by the power of an electric motor; electric cars, including electric vehicles (EV), hybrid electric vehicles (HEV), plug-in hybrid electric vehicles (PHEV), or the like; electric two-wheeled vehicles, including E-bikes and E-scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLES

(1) Manufacture of Separator

Example 1

First, $Al_2O_3$($D_{50}$: 500 nm), PVAc (Mw: 150,000, Tg: 40° C.), PMMA (Mw: 130,000, Tg: 116° C.) and a dispersing agent (tannic acid) were introduced to acetone to obtain the first slurry. Meanwhile, PAN (Mw: 150,000, Tg: 85° C., Tm: 320° C.) was dissolved in DMF to prepare a polymer solution. Next, the first slurry was mixed with the polymer solution to prepare slurry for forming a porous coating layer (the second slurry). The second slurry had a concentration of 18 wt %, and the weight ratio of $Al_2O_3$, PVAc, PMMA, PAN and the dispersing agent (tannic acid) in the second slurry was 80:16:2:1:1. The slurry was applied onto a separator (polyethylene, porosity 45%, thickness 16 μm, air permeability 100 sec/100 cc) at a loading amount of 13.5 $g/m^2$ based on the area of the separator, followed by drying. The drying was carried out at 23° C. under a humidified condition of a relative humidity of 45%. Then, the resultant product was cut into a size of 60 mm (length)×25 mm (width) to obtain a separator. The resultant separator had a thickness of 25 μm.

Example 2

Figure 4A:
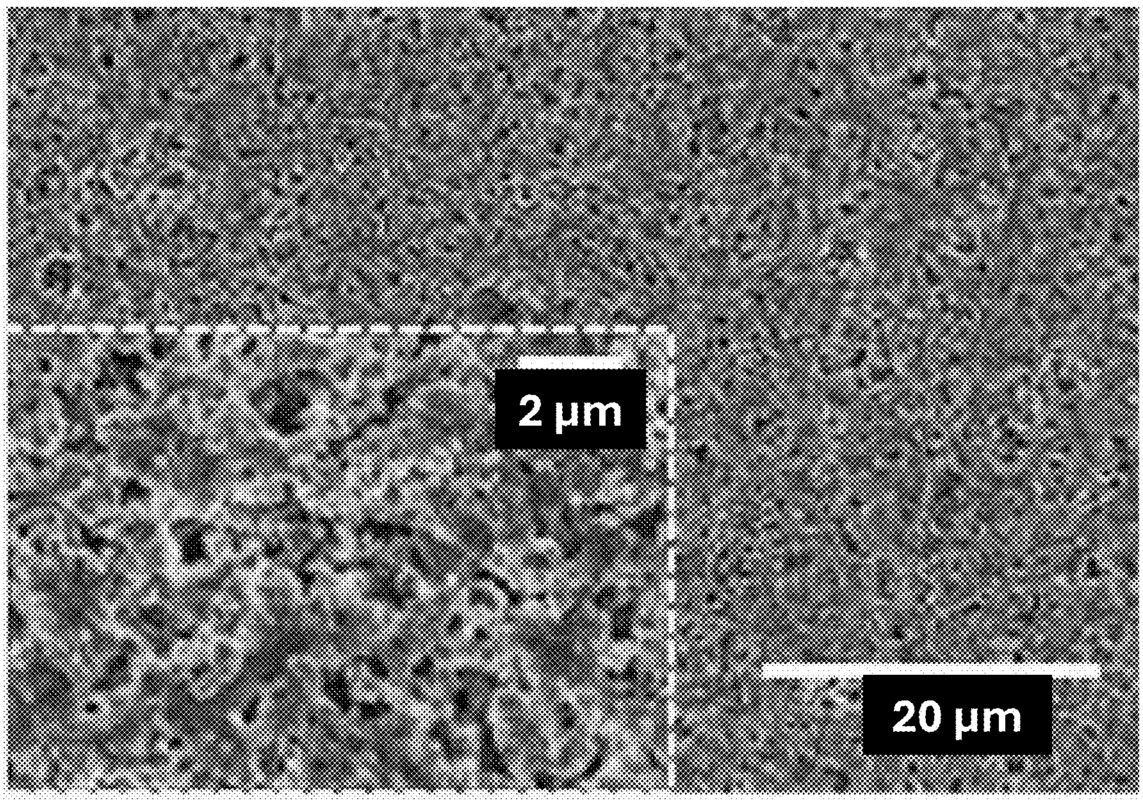
FIG. 4*a*, FIG. 4*b*, FIG. 4*c* and FIG. 4*d* show the scanning electron microscopic (SEM) images of the separator surfaces of Examples 2-4 and Comparative Example 4, respectively.

A separator was obtained in the same manner as Example 1, except that PAN was not used, and $Al_2O_3$, PVAc, PMMA, PAN and the dispersing agent (tannic acid) were introduced to acetone at a weight ratio of 80:17:2:1 to obtain slurry for forming a porous coating layer. The scanning electron microscopic (SEM) image of the surface of the separator is shown in FIG. 4*a*.

Example 3

Figure 4B:
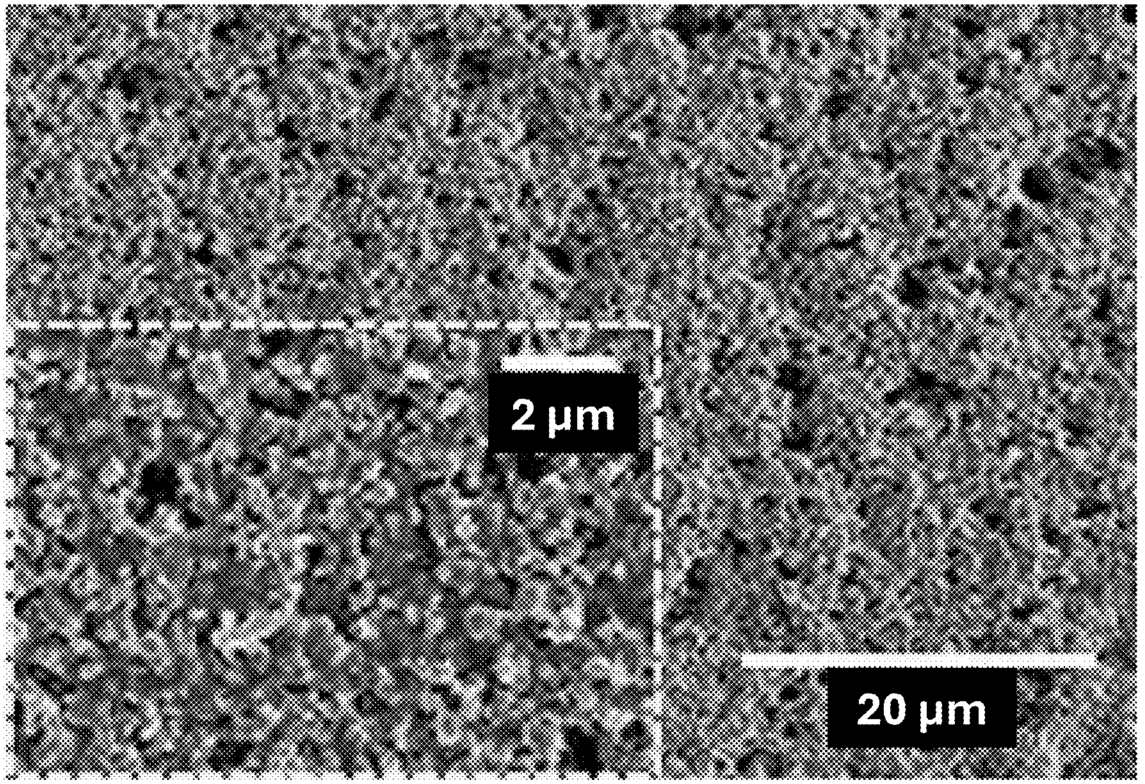

A separator was obtained in the same manner as Example 1, except that PAN was not used, and $Al_2O_3$, PVAc, PMMA, PAN and the dispersing agent (tannic acid) were introduced to acetone at a weight ratio of 80:15:4:1 to obtain slurry for forming a porous coating layer. The scanning electron microscopic (SEM) image of the surface of the separator is shown in FIG. 4*b*.

Example 4

Figure 4C:
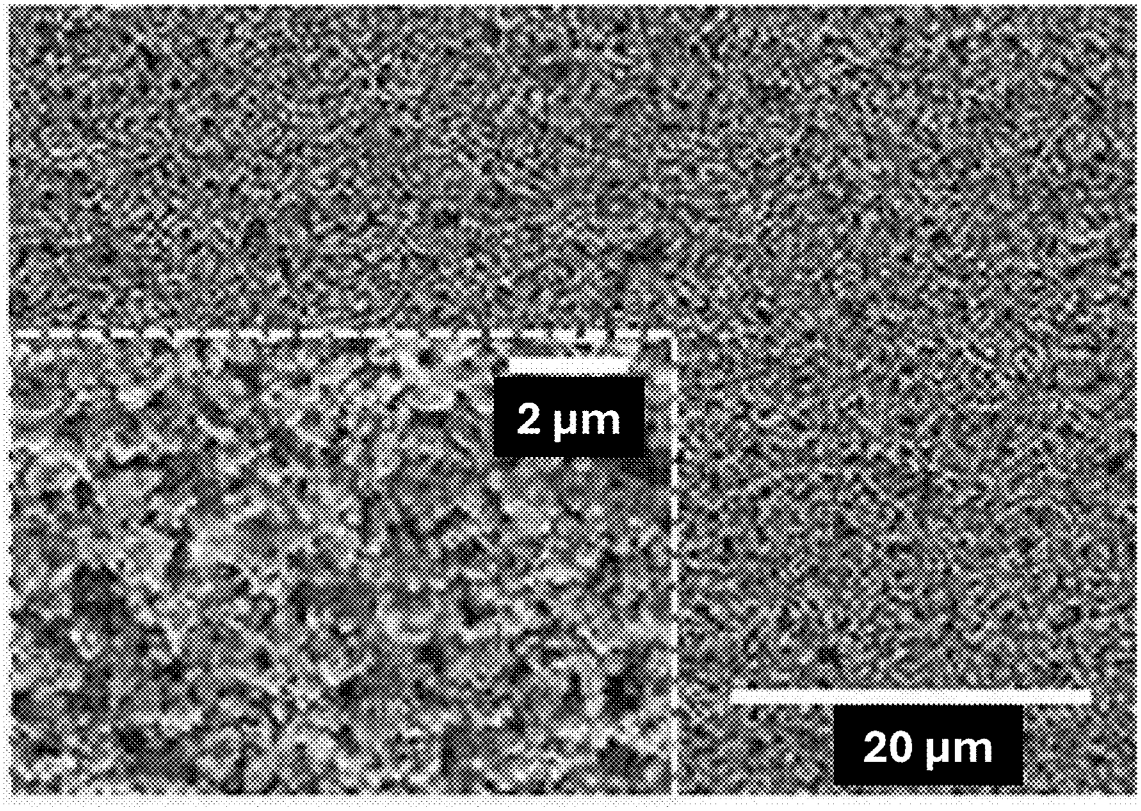

A separator was obtained in the same manner as Example 1, except that PAN was not used, and $Al_2O_3$, PVAc, PMMA, PAN and the dispersing agent (tannic acid) were introduced to acetone at a weight ratio of 80:9.5:9.5:1 to obtain slurry for forming a porous coating layer. The scanning electron microscopic (SEM) image of the surface of the separator is shown in FIG. 4*c*.

Comparative Example 1

First, $Al_2O_3$, PVDF-HFP (Mw: 400,000, Tm: 145° C.), PVDF-CTFE (Mw: 400,000, Tm: 160° C.) and a dispersing agent (tannic acid) were introduced to acetone at a weight ratio of 80:10:9:1 to obtain slurry for forming a porous coating layer. The resultant slurry was applied onto a separator (polyethylene, porosity 45%, thickness 16 μm) at a loading amount of 13.5 $g/m^2$ based on the area of the separator, followed by drying. The drying was carried out at 23° C. under a humidified condition of a relative humidity of 45%. Then, the resultant product was cut into a size of 60 mm (length)×25 mm (width) to obtain a separator. The resultant separator had a thickness of 25 μm.

Comparative Example 2

First, $Al_2O_3$, PVAc and a dispersing agent were introduced to acetone at a weight ratio of 80:19:1 to obtain slurry for forming a porous coating layer. The resultant slurry was applied onto a separator (polyethylene, porosity 45%, thickness 16 μm) at a loading amount of 13.5 $g/m^2$ based on the area of the separator, followed by drying. The drying was carried out at 23° C. under a humidified condition of a relative humidity of 45%. Then, the resultant product was cut into a size of 60 mm (length)×25 mm (width) to obtain a separator.

Comparative Example 3

First, $Al_2O_3$, PMMA and a dispersing agent were introduced to acetone at a weight ratio of 80:19:1 to obtain slurry for forming a porous coating layer. The resultant slurry was applied onto a separator (polyethylene, porosity 45%, thickness 16 μm) at a loading amount of 13.5 $g/m^2$ based on the area of the separator, followed by drying. The drying was carried out at 23° C. under a humidified condition of a relative humidity of 45%. Then, the resultant product was cut into a size of 60 mm (length)×25 mm (width) to obtain a separator.

Comparative Example 4

Figure 4D:
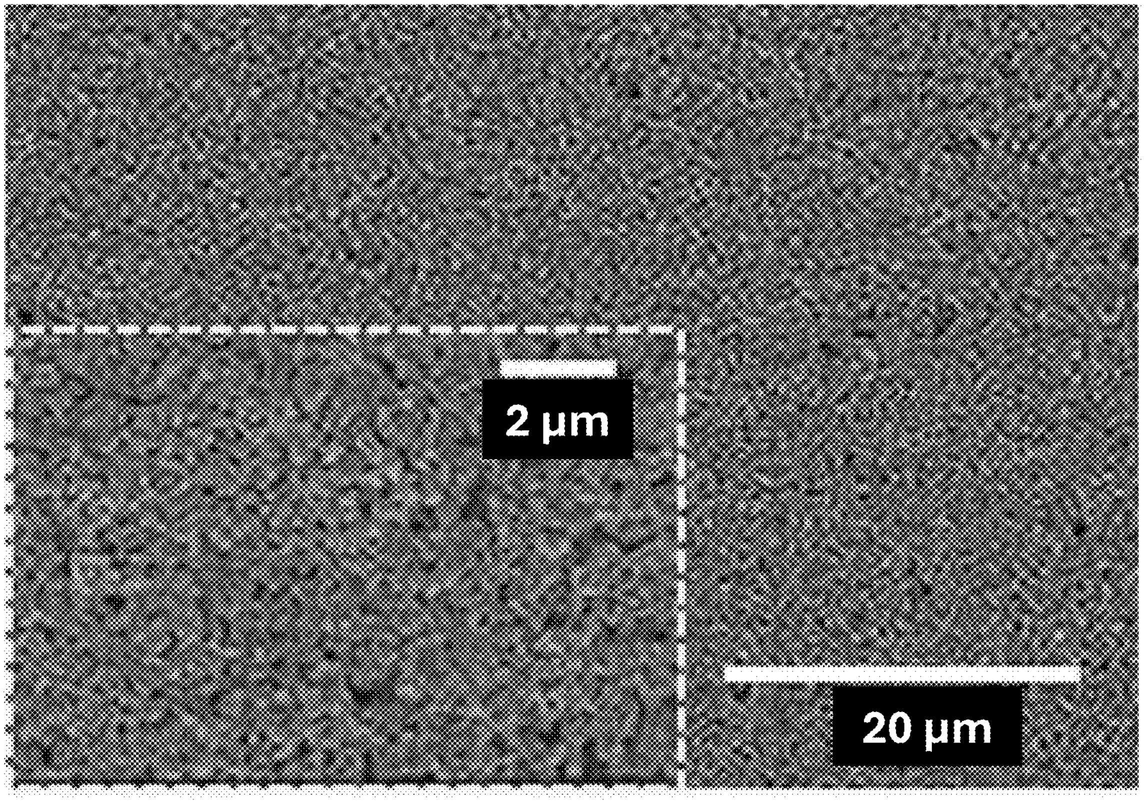

First, $Al_2O_3$, PVAc, PMMA and a dispersing agent were introduced to acetone at a weight ratio of 80:6:13:1 to obtain slurry for forming a porous coating layer. The resultant slurry was applied onto a separator (polyethylene, porosity 45%, thickness 16 μm) at a loading amount of 13.5 $g/m^2$ based on the area of the separator, followed by drying. The drying was carried out at 23° C. under a humidified condition of a relative humidity of 45%. Then, the resultant product was cut into a size of 60 mm (length)×25 mm (width) to obtain a separator. The scanning electron microscopic (SEM) image of the surface of the separator is shown in FIG. 4*d*.

Comparative Example 5 (Using PVAc Having Molecular Weight Outside Specified Range)

First, $Al_2O_3(D_{50}$: 500 nm), PVAc (Mw: 800,000, Tg: 40° C.), PMMA (Mw: 130,000, Tg: 116° C.) and a dispersing agent (tannic acid) were introduced to acetone to obtain the first slurry. Meanwhile, PAN (Mw: 150,000, Tg: 85° C., Tm: 320° C.) was dissolved in DMF to prepare a polymer solution. Next, the first slurry was mixed with the polymer solution to prepare slurry for forming a porous coating layer (the second slurry). The second slurry had a concentration of 18 wt %, and the weight ratio of $Al_2O_3$, PVAc, PMMA, PAN and the dispersing agent (tannic acid) in the second slurry was 80:16:2:1:1. The slurry was applied onto a separator (polyethylene, porosity 45%, thickness 16 μm, air permeability 100 sec/100 cc) at a loading amount of 13.5 $g/m^2$ based on the area of the separator, followed by drying. The drying was carried out at 23° C. under a humidified condition of a relative humidity of 45%. Then, the resultant product was cut into a size of 60 mm (length)×25 mm (width) to obtain a separator. The resultant separator had a thickness of 25 μm.

(2) Manufacture of Electrode

Natural graphite, SBR and CMC (weight ratio 90:9:1) were introduced to water to obtain negative electrode slurry. The negative electrode slurry was applied onto copper foil (thickness 10 μm) at a loading amount of 125 $mg/cm^2$, followed by drying. Then, the resultant structure was pressed to a thickness of 90 μm and cut into a size of 50 mm (length)×25 mm (width) to obtain a negative electrode.

(3) Determination of Adhesion to Electrode

Each of the separators according to Examples and Comparative Examples was cut into a size of 60 mm (length)×25 mm (width). The negative electrode prepared as described above was laminated with each separator by using a press at 60° C. under 6.5 MPa to obtain a specimen. The obtained specimen was attached and fixed to a glass plate by using a double-sided adhesive tape in such a manner that the negative electrode might face the glass plate. Then, the separator portion of the specimen was peeled at 25° C. and a rate of 300 m/min with an angle of 180°, and the strength at this time was measured. The results of determination of the adhesion between the separator and the negative electrode is shown in the following Table 1 and FIG. 1. Meanwhile, five separator specimens obtained by the same method as described in Comparative Example 2 were prepared and peeled at 25° C. and a rate of 300 m/min with an angle of 180°, and the peel strength depending on distance was measured. The results are shown in the following Table 2 and FIG. 2.

(4) Determination of Shrinkage of Separator

Figure 2:
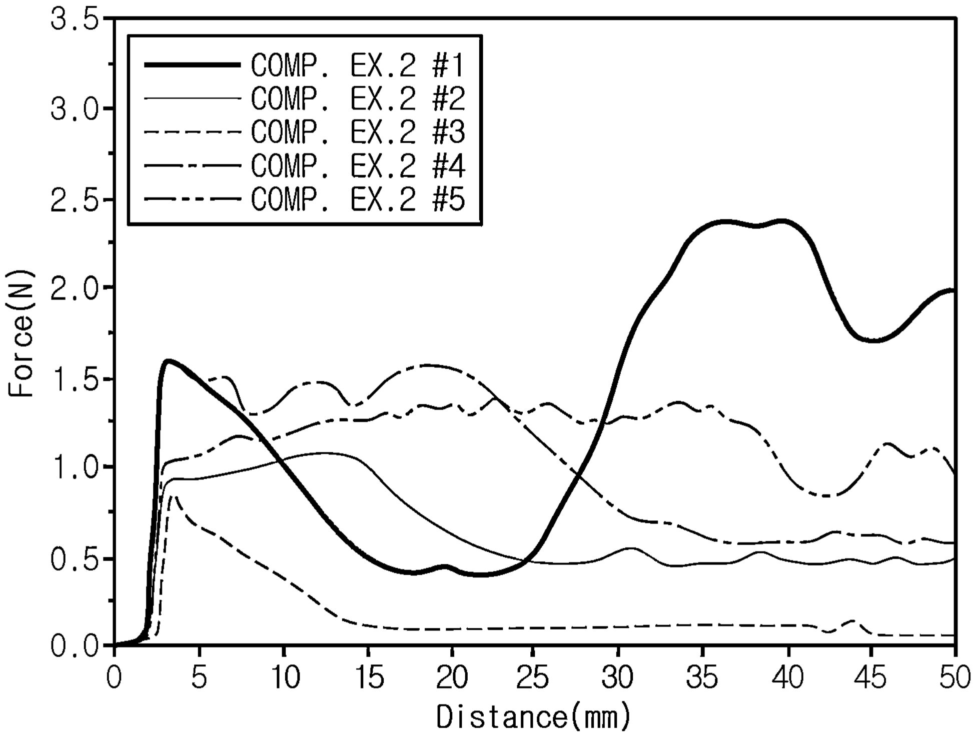
FIG. 2 shows the result of determination of the peel strength of the separator specimen obtained according to Comparative Example 2.

Each of the separators according to Examples and Comparative Examples was allowed to stand at 130° C. for 0.5 hours, and the shrinkage of each separator was determined. The shrinkage was obtained by marking two points optionally on the separator and calculating an increase/decrease in the interval (point interval) between the two points according to the following Formula 1. FIG. 2 show the photographic views illustrating the separators according to Examples 1 and 2, before and after the determination of the shrinkage. It can be seen from the results that the separators according to Examples 1 and 2 shows excellent shrinkage characteristics as determined by a shrinkage of 1% or less.

$$\text{Shrinkage } (\%)=\{(B-A)/A\}\times 100 \qquad \text{[Formula 1]}$$

In Formula 1, A is a point interval at the initial stage before each separator is allowed stand at high temperature, and B is a point interval at the final stage after each separator is allowed stand at high temperature.

The following Table 1 shows the results obtained from the above-described tests.

TABLE 1

| | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|
| Ingredients and composition of binder resin composition | PVAc/ PMMA/ PAN | PVAc/ PMMA (9:1, weight ratio) | PVDF-HFP, PVDF-CTFE | PVAc | PMMA | PVAc/ PMMA (2:8, weight ratio) | PVAc/ PMMA/ PAN |
| Thickness of separator (μm) | 25 | 25 | 25 | 25 | 25 | 25 | 25 |
| Air permeability of separator (sec/100 cc) | 356 | 240 | 300 | 264 | 220 | 189 | 460 |
| Adhesion of separator with negative electrode (N) | 1.907 | 1.270 | 0.857 | 0.048-1.192 | 0.053 | 0.292 | 0.350 |
| Heat shrinkage of separator (%) | 0 | 1 | 2 | 1 | 4 | 2 | 0 |

Figure 3:
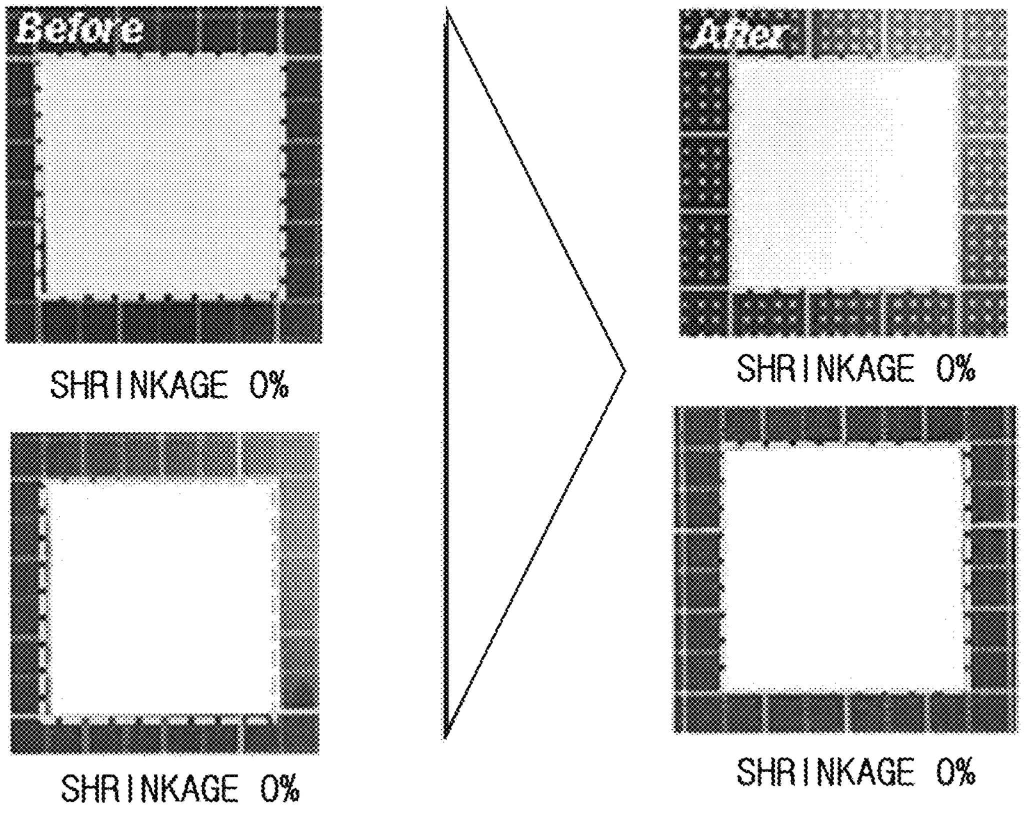
FIG. 3 shows the result of evaluation of the shrinkage of each of the separators according to Examples 1 and 2.

As can be seen from Table 1, the separators of Examples 1 and 2 according to the present disclosure ensure a level of air permeability applicable to a separator for an electrochemical device. In addition, the separators according to Examples 1 and 2 show improved adhesion to the electrode and improved heat shrinkage as compared to the separators according to Comparative Examples 1-5. Meanwhile, FIG. 3 shows the photographic images of the separator according to Example 1 before and after the evaluation of heat shrinkage. The separator according to Example 1 shows a shrinkage of 0% in both tests.

TABLE 2

| Specimen No. of Comp. Ex. 2 | Mean Force (N) |
|---|---|
| #1 | 1.192 |
| #2 | 0.285 |
| #3 | 0.048 |
| #4 | 0.815 |
| #5 | 1.084 |

Meanwhile, as can be seen from FIG. 2, separator specimen #1 to separator specimen #5 derived from the separator obtained from Comparative Example 2 shows low uniformity in terms of the adhesion depending on the distance of each specimen. In addition, as can be seen from the results of the mean force calculated from each specimen in Table 2, it is difficult to reproduce constant adhesion.

Meanwhile, the SEM images of the separators according to Examples 2-4 and Comparative Example 4 are shown in FIG. 4*a*, FIG. 4*b*, FIG. 4*c* and FIG. 4*d*, respectively. It can be determined from the SEM images that as the content of PMMA is increased, phase separation of the binder resin composition toward the surface of the separator is deteriorated, and thus the content of the binder resin composition at the surface portion is low. Therefore, it can be seen from the results that an excessively high content of the second binder resin, such as PMMA, may cause degradation of the adhesion.

What is claimed is:

1. A separator for an electrochemical device which comprises:

a porous separator substrate; and a porous coating layer on at least one surface of the porous separator substrate, wherein the porous coating layer comprises inorganic particles and a binder resin at a weight ratio of 50:50-99:1, wherein the binder resin comprises a first binder resin and a second binder resin, wherein the first binder resin is an ethylenic polymer resin comprising a polar group, the first binder resin having a glass transition temperature (Tg) of 30° C. to 60° C., wherein the second binder resin is an acrylic binder resin, the second binder resin having a glass transition temperature (Tg) of 80° C. to 120° C., wherein the first binder resin is present in an amount of more than 70 wt % to 90 wt % based on 100 wt % of the binder resin, and wherein the second binder resin is present in an amount of 10 wt % to 21.1 wt % based on 100 wt % of the binder resin.

2. The separator for the electrochemical device according to claim 1, wherein the porous coating layer comprises the inorganic particles and a total of the first binder resin and the second binder resin at a weight ratio of 50:50-99:1.

3. The separator for the electrochemical device according to claim 1, wherein the weight ratio is 50:50-80:19.

4. The separator for the electrochemical device according to claim 1, wherein the first polymer resin has a molecular weight of 100,000 to 500,000 and comprises polyvinyl acetate (PVAc) represented by Chemical Formula 1:

[Chemical Formula 1]

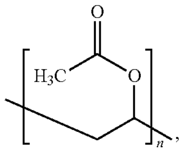

wherein n is an integer of 1 or more.

5. The separator for the electrochemical device according to claim 1, wherein the second binder resin is presented in an amount of 10.5 wt % to 21.1 wt % based on 100 wt % of the binder resin.

6. The separator for the electrochemical device according to claim 1, wherein the second polymer resin comprises polymethyl methacrylate represented by Chemical Formula 2:

[Chemical Formula 2]

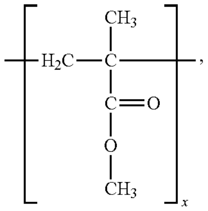

wherein x is an integer of 1 or more.

7. The separator for the electrochemical device according to claim 1, wherein the binder resin further comprises a third binder resin having a molecular weight of 500,000 or less, and the third binder resin is a vinylic polymer having a cyano group bound to a vinylic polymer backbone thereof.

8. The separator for the electrochemical device according to claim 7, wherein the third binder resin is present in an amount of 6 wt % or less based on 100 wt % of the binder resin.

9. The separator for the electrochemical device according to claim 7, wherein the third binder resin comprises polyacrylonitrile.

10. The separator for the electrochemical device according to claim 7, wherein the first polymer resin has a molecular weight of 100,000-500,000 and comprises polyvinyl acetate represented by Chemical Formula 1:

[Chemical Formula 1]

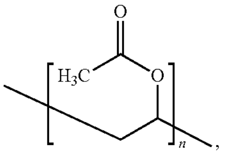

wherein n is an integer of 1 or more.

11. An electrochemical device, comprising:

a positive electrode, a negative electrode, and the separator according to claim 1 interposed between the positive electrode and the negative electrode.

12. A lithium-ion secondary battery comprising the electrochemical device according to claim 11.

13. A separator for an electrochemical device, comprising:

a porous separator substrate, and a porous coating layer on at least one surface of the porous separator substrate, wherein the porous coating layer comprises inorganic particles and a binder resin at a weight ratio of 50:50 to 99:1, wherein the binder resin comprises a first binder resin, a second binder resin and a third binder resin, wherein the first binder resin has a glass transition temperature (Tg) of 30° C. to 60° C. and comprises polyvinyl acetate, wherein the second binder resin has a glass transition temperature (Tg) of 80° C. to 120° C. and comprises polymethyl methacrylate, wherein the third binder resin comprises polyacrylonitrile, wherein the first binder resin is present in an amount of more than 70 wt % to 90 wt % based on 100 wt % of the binder resin, and wherein the second binder resin is present in an amount of 10 wt % to 21.1 wt % based on 100 wt % of the binder resin.

14. The separator for the electrochemical device according to claim 13, wherein the porous coating layer comprises the inorganic particles and a total of the polyvinyl acetate, the polymethyl methacrylate, and the polyacrylonitrile at a weight ratio of 50:50-99:1.

15. The separator for the electrochemical device according to claim 13, wherein the second binder resin is presented in an amount of 10.5 wt % to 21.1 wt % based on 100 wt % of the binder resin.

16. The separator for the electrochemical device according to claim 9, wherein the weight ratio is 50:50-80:19.

* * * * *